United States Patent
Manire

[11] Patent Number: 5,823,566
[45] Date of Patent: Oct. 20, 1998

[54] AIR BAG MODULE WITH DEPLOYMENT FLAP

[75] Inventor: Gregory B. Manire, Oxford, Mich.

[73] Assignee: AlliedSignal Inc., Morristown, N.J.

[21] Appl. No.: 730,978

[22] Filed: Oct. 16, 1996

[51] Int. Cl.$^6$ .................................................. B60R 21/16
[52] U.S. Cl. .................... 280/728.3; 280/732; 280/743.1
[58] Field of Search .............................. 280/728.3, 732, 280/743.1

[56] References Cited

U.S. PATENT DOCUMENTS

| | | | |
|---|---|---|---|
| 5,234,227 | 8/1993 | Webber | 280/732 |
| 5,240,282 | 8/1993 | Wehner et al. | 280/728.3 |
| 5,242,192 | 9/1993 | Prescaro et al. | 280/732 |
| 5,429,385 | 7/1995 | Kamiji et al. | 280/728.3 |
| 5,441,299 | 8/1995 | Lauritzen et al. | 280/732 |
| 5,452,913 | 9/1995 | Hansen et al. | 280/732 |
| 5,468,012 | 11/1995 | Mihm | 280/728.2 |

FOREIGN PATENT DOCUMENTS 0 620 139 A1  10/1994  European Pat. Off. .
44 19 565 A1  3/1995  Germany .

*Primary Examiner*—Kenneth R. Rice
*Attorney, Agent, or Firm*—Markell Seitzman

[57] ABSTRACT

An air bag module (10) comprising a housing (12) having sides (14) and an open mouth (18); an air bag (22) mounted within the housing prior to deployment of thereof in a compact configuration; a retainer flap (100) comprising a single piece of material, having a tearable region (110) thereon, enveloping the air bag to retain the air bag in its compact configuration prior to deployment and being of sufficient length such that upon deployment of the air bag, the flap (100) is extendible to lie between the mouth of the housing and the deployed air bag to protect the air bag. The flap having a main body (102) and the at least one leg (104) extending therefrom having mounting openings (108) for attaching the flap to corresponding mounting fasteners (54), wherein the length of the main body is sufficient to extend beyond the mouth of the housing after the tear regions have been severed upon the deployment of the air bag to provide a protective layer between the housing (and/or instrument panel) and the deployed air bag.

13 Claims, 3 Drawing Sheets

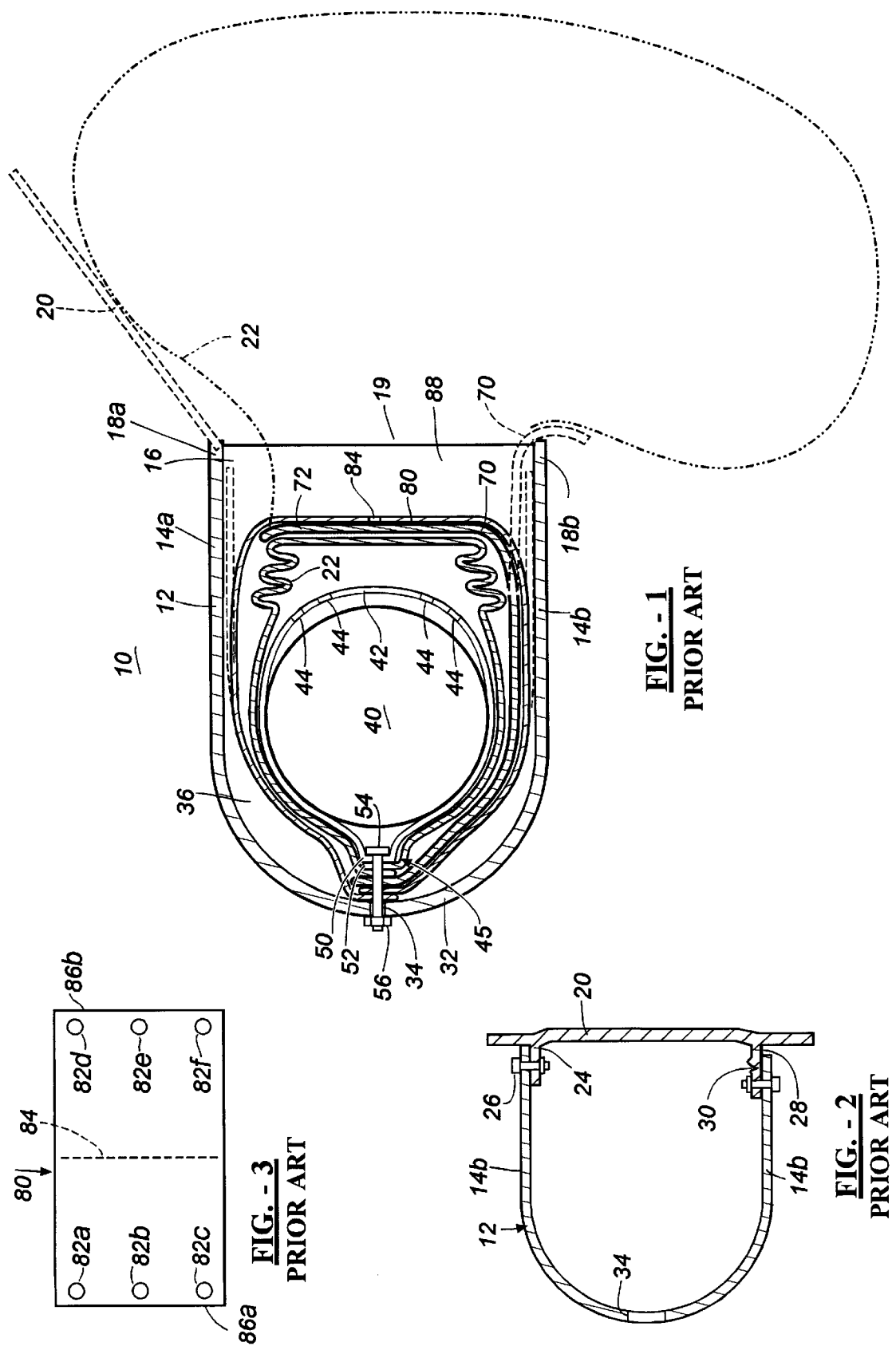

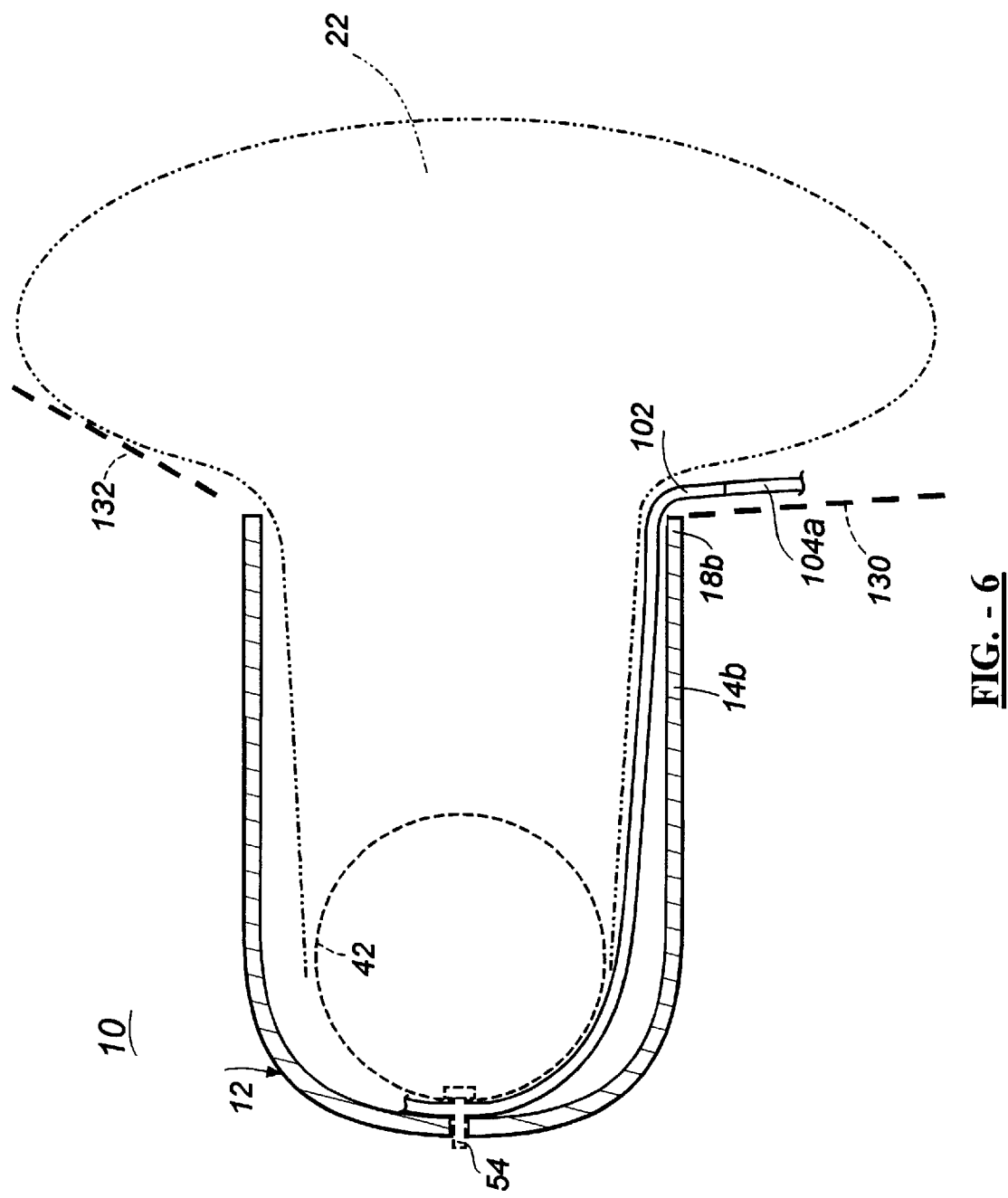

5,823,566

AIR BAG MODULE WITH DEPLOYMENT FLAP

BACKGROUND AND SUMMARY OF THE INVENTION

The present invention generally relates to air bags and air bag modules and more particularly to a deployment flap which protects the air bag upon deployment.

Reference is made to FIGS. 1–3 which illustrate the typical construction of an air bag module, generally shown as 10. The module includes a reaction can or housing 12 having an open mouth 19 defined by parallel walls 14a and 14b, the sides of which are enclosed by the end caps 16, only one of which is shown. Secured to ends 18a and 18b of each wall 14a,14b (and/or also to the end caps) is a deployment door 20 which pivots outwardly upon deployment of an air bag 22. FIG. 2 illustrates a cross-sectional view showing the housing and deployment door 20. As can be seen, the deployment door includes a hinge flange 24 secured appropriately by fasteners 26 or the like to side 14a and a tear seam flange 28 secured by fasteners to side 14b. The tear seam flange 28 includes one or more thinned regions or tear seams, of material, generally shown as 30, which rip apart upon deployment of the air bag 22. Once the tear seam flange is ripped, the door (or cover) 20 pivots outwardly as shown in phantom line in FIG. 1. The lower end or bottom 32 of the housing generally includes a plurality of openings 34. Situated within a cavity 36 defined by the housing is an inflator generally shown as 40. The inflator may be secured within a cylindrically shaped manifold 42 having a series of openings 44 running across its length so that inflation gas produced by the inflator flows through these openings to inflate the air bag 22. As can be seen in FIG. 1, the air bag is shown in a folded configuration as well as in an inflated configuration (see phantom lines). The bottom 50 of the manifold includes a plurality of openings 52 through which are received a like number of fasteners 54 such as a threaded bolt. Each bolt 54 also extends through a corresponding opening 34 in the housing. A like plurality of nuts 56 may be threadably received upon a corresponding bolt 54 to secure the manifold 42 and inflator 40 to the housing. The above configuration is not unlike the configuration illustrated in U.S. Pat. No. 4,964,654 which is incorporated herein by reference. The folded air bag is placed over the manifold 42 and secured in place. In the configuration illustrated in FIG. 1, a deployment flap 70 partially envelops the folded air bag 22. While not illustrated, the deployment flap comprises a rectangularly shaped piece of woven air bag material typically coated with silicone or neoprene. One end of this rectangularly shaped piece has a plurality of openings, corresponding to the number of the bolts extending from the manifold 42. The end of the deployment flap with these openings is received about the bolts 54. The other end of the deployment flap generally shown as 72 is draped over the folded air bag. The air bag is maintained in its folded configuration by enveloping the folded air bag and deployment flap with a frangible layer of material 80. This frangible layer of material is often constructed of Tyvek and is rectangularly shaped having two sets of openings 82a–c and 82d–f. This retaining material 80 includes one or more tear lines (or seams as they are often called) comprising a plurality of perforations 84. The Tyvek retainer 84 is secured about the bolts 54 such that its ends 86a and 86b overlap one another with the main body of the retainer 80 holding the folded air bag in place. The deployment flap 70 is chosen sufficiently long that upon deployment of the air bag (see phantom lines of FIG. 1) it extends beyond the open end 88 of the housing and provides a barrier between the inflated air bag and the mouth 19 of the housing 12 or adjacent instrument panel to prevent the air bag from becoming caught or damaged by a rough edge of the housing or instrument panel during deployment thereof.

It is an object of the present invention to provide an improved and simplified air bag module.

A more specific object of the invention is to provide a protective deployment flap which envelops and holds the air bag in place prior to deployment but during and after the deployment of the air bag, protectively insulates the air bag from contact with portions of a housing.

Accordingly the invention comprises: an air bag module comprising a housing having sides cooperating and defining an open mouth; an air bag mounted within the housing prior to deployment thereof in a compact configuration; a retainer flap comprising a single piece of material, having a tearable region thereon, enveloping the air bag to retain the air bag in its compact configuration prior to deployment and being of sufficient length such that upon deployment of the air bag, the flap is extendible to lie between the mouth of the housing or instrument panel and the deployed air bag to protect the air bag. In the preferred embodiment of the invention the flap comprises the main body and at least one leg extending therefrom, both having mounting openings for attaching the flap to corresponding mounting fasteners, wherein the length of the main body is sufficient to extend beyond the mouth of the housing after the tear regions have been severed in response to the deployment of the air bag to provide a protective layer between the housing (and/or instrument panel) and the deployed air bag.

Many other objects and purposes of the invention will be clear from the following detailed description of the drawings.

BRIEF DESCRIPTION OF THE DRAWINGS

In the drawings:

FIG. 1 illustrates a cross-sectional view of a prior art air bag module.

FIG. 2 illustrates a deployment cover attached to a housing.

FIG. 3 illustrates a fabric air bag retainer.

FIG. 6 illustrates the deployment flap in the position subsequent to the inflation of an air bag.

DETAILED DESCRIPTION OF THE DRAWINGS

Figure 4:
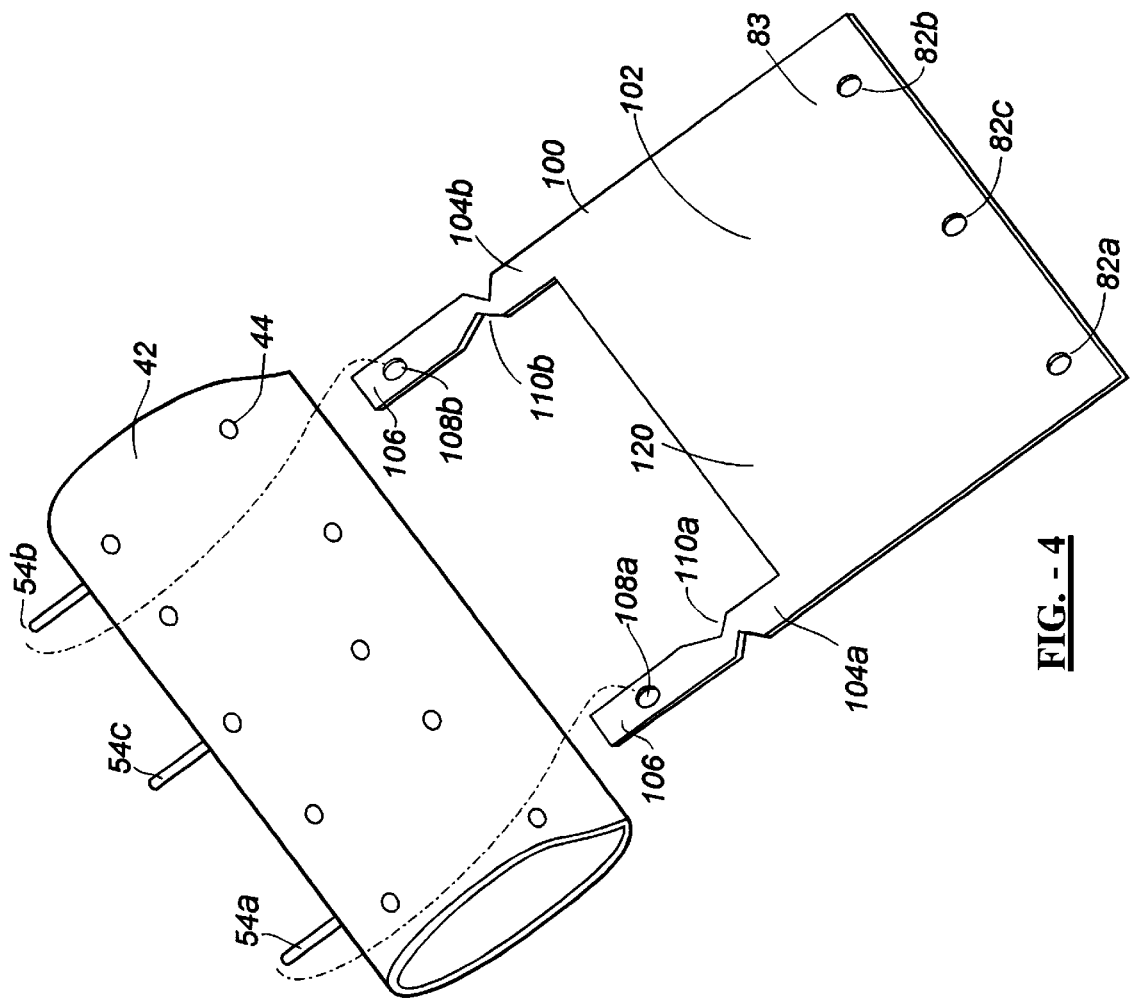
FIG. 4 is a partial assembly view illustrating the present invention.
Figure 5:
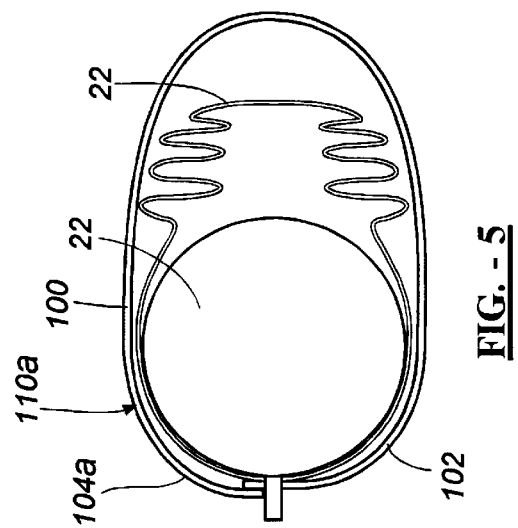
FIG. 5 is a cross-sectional view showing the deployment flap of the present invention enveloping a manifold and folded air bag.

Reference is made to FIG. 4 which is a partial assembly view showing the cylindrical manifold 42 which has three bolts or studs 54 extending therefrom. As is known in the art a manifold, having mounting bolts extending therefrom, is often used in conjunction with a hybrid inflator to avoid placing such mounting bolts on the body of the inflator proximate the internal pressure vessel portion of the hybrid inflator. While a hybrid inflator and its manifold have been used to describe the present invention, the present invention is applicable with other types of inflators such as those that use a solid propellant to generate the inflation gas. In these solid propellant type of inflators the mounting studs or bolts 54 can extend directly from the body of this type of inflator with the air bag similarly attached to the inflator as opposed to being attached to the manifold. The air bag 22 is secured about the bolts 54 (of an inflator or manifold, as the case may be), folded, and secured in place by a deployment flap 100.

The deployment flap 100 comprises a main body 102 having a plurality of openings 82a,b and c, located in an end 83. When installed each opening is received on one of the studs or bolts 54. Extending from the main body are two legs 104a and 104b. Proximate the ends 106 of each of the legs is another mounting opening 108a and 108b. Each leg has a stress riser (or tear seam or line) 110a and 110b which defines the preferred region, along which each leg will tear upon being stressed as the air bag is deployed. The flap is constructed of a rugged material such as Tyvek, or may be a woven fabric, such as that used to make the air bag, and may be coated with silicone or neoprene.

After the air bag 22 is secured about the manifold 42 or inflator, as the case may be, the air bag is folded in a known manner and secured to the manifold (or inflator) by a flap 100. During assembly the main body 102 is first secured to the studs 54a–c. Thereafter, the flap 100 is wrapped about the previously folded air bag 22 and the holes 108a and b are secured to the studs 54a and 54b thereby preventing the air bag 22 from unfolding.

Upon deployment of the air bag 22 the stress risers 110a and b in each leg 104a and b will tear. As the air bag continues to deploy, the main body 102 of the flap 100 rotates or unfurls about the air bag as it inflates and is laid flat (see FIG. 6) against an inner wall 14b and against an open end such as 18b of the housing and protrudes slightly past the open end 18b, thereby providing a protective layer between the housing 12 and the air bag 22. The flap may also be sufficiently long to extend to an adjacent portion of an instrument panel 130. The length of the main body 102 of the flap 100, measured from its connection to the bolts to the stress risers 110a,b, is chosen to be a) sufficiently long to enable the flap to envelope the folded air bag and b) sufficiently long such that when the air bag is inflated the end 120 of the main body 102 is positioned about the open end or mouth 18b of the housing (and/or instrument panel) to protect the air bag from coming in contact with the housing or instrument panel. As can be seen from FIG. 6 the flap 100 lies over the lower horizontal edge of the housing while not providing any protection for the air bag against the upper edges of the housing. This condition is not atypical of the operation of an air bag system. As is often the case, the air bag is designed to unfold downwardly to envelop the lower torso of the occupant. As the air bag more fully inflates it extends upwardly, often encountering the windshield 132 which maintains the air bag spaced from the upper edges of the air bag housing.

Many changes and modifications in the above described embodiment of the invention can, of course, be carried out without departing from the scope thereof. Accordingly, that scope is intended to be limited only by the scope of the appended claims.

I claim:

1. An air bag module (10) comprising a housing (12) having an open mouth (18a,b);

an air bag (22) mounted within the housing prior to deployment in a compact configuration;

a retainer flap (100) having a tearable region thereon, the flap looped about the air bag to retain the air bag in its compact configuration prior to deployment and upon being torn a portion thereof is of sufficient length such that upon deployment of the air bag, the flap is positioned to lie between the mouth of the housing and the deployed air bag to protect the air bag.

2. The device as defined in claim 1 wherein the flap includes a main body (102) and at least one leg (104a,b) extending from the main body, wherein the tearable region comprises a stress riser on the at least one leg.

3. The device as defined in claim 2 wherein the flap includes two legs.

4. The device as defined in claim 2 wherein the main body (102) and the at least one leg (104a,b) include mounting openings (82a–c; 108a,b) for attaching the flap to corresponding mounting fasteners (54).

5. The device as defined in claim 2 wherein the length of the main body is sufficient to extend beyond the mouth of the housing after the tear regions have been severed upon the deployment of the air bag to provide a protective layer between the housing and an adjacent portion of an instrument panel and the deployed air bag.

6. The device as defined in claim 4 wherein the main body of the flap is coated.

7. An air bag module (10) comprising a housing (12) having an open mouth (18a,b);

an air bag (22) mounted within the housing prior to deployment in a compact configuration;

a retainer flap (100) including a first end, a main body and an opposite second end positioned proximate the first end, and having a tearable region thereon between the second end and the main body (102), the main body enveloping the air bag to retain the air bag in its compact configuration prior to deployment and also being of sufficient length such that upon deployment of the air bag, the flap is positioned to lie between the mouth of the housing and the deployed air bag to protect the air bag.

8. The device as defined in claim 7 wherein the flap includes and at least one leg (104a,b) extending from the main body, wherein the tearable region comprises a stress riser on the at least one leg.

9. The device as defined in claim 8 wherein the flap includes two legs.

10. The device as defined in claim 8 wherein the main body (102) and the at least one leg (104a,b) include mounting openings (82a–c;108a,b) for attaching the flap to corresponding mounting fasteners (54).

11. The device as defined in claim 8 wherein the length of the main body is sufficient to extend beyond the mouth of the housing after the tear regions have been severed upon the deployment of the air bag to provide a protective layer between the housing and an adjacent portion of an instrument panel and the deployed air bag.

12. The device as defined in claim 10 wherein the main body of the flap is coated.

13. An air bag module (10) comprising a housing (12) having an open mouth (18a,b);

an air bag (22) mounted within the housing prior to deployment in a compact configuration;

a retainer flap (100) including a first end, a main body and an opposite second end positioned proximate the first end, and having a tearable region thereon relatively located adjacent a portion of the compact air bag opposite the mouth of the housing, the main body enveloping the air bag to retain the air bag in its compact configuration prior to deployment and also being of sufficient length such that upon deployment of the air bag, the main body of the flap is positioned to lie between the mouth of the housing and the deployed air bag to protect the air bag.

* * * * *